(12) United States Patent
Craig et al.

(10) Patent No.: US 10,408,212 B2
(45) Date of Patent: Sep. 10, 2019

(54) GEAR PUMP HAVING THROUGH-SHAFT BEARING WEEPAGE CONTROL

(71) Applicant: CIRCOR PUMPS NORTH AMERICA, LLC, Monroe, NC (US)

(72) Inventors: Justin A. Craig, Monroe, NC (US); Philip Taylor Alexander, Matthews, NC (US)

(73) Assignee: Circor Pumps North America, LLC, Monroe, NC (US)

( * ) Notice: Subject to any disclaimer, the term of this patent is extended or adjusted under 35 U.S.C. 154(b) by 65 days.

(21) Appl. No.: 15/312,346

(22) PCT Filed: Apr. 15, 2015

(86) PCT No.: PCT/US2015/025904
§ 371 (c)(1),
(2) Date: Nov. 18, 2016

(87) PCT Pub. No.: WO2015/179042
PCT Pub. Date: Nov. 26, 2015

(65) Prior Publication Data
US 2017/0089335 A1 Mar. 30, 2017

Related U.S. Application Data

(60) Provisional application No. 62/001,195, filed on May 21, 2014.

(51) Int. Cl.
*F03C 2/00* (2006.01)
*F03C 4/00* (2006.01)
(Continued)

(52) U.S. Cl.
CPC .................. *F04C 2/14* (2013.01); *F04C 2/18* (2013.01); *F04C 13/002* (2013.01);
(Continued)

(58) Field of Classification Search
CPC .... F04C 2/14; F04C 15/0057; F04C 2240/50; F04C 2240/60; F16C 33/04; F16C 2360/00
(Continued)

(56) References Cited

U.S. PATENT DOCUMENTS 1,946,510 A 2/1934 Truesdell et al.
2,391,072 A 12/1945 Pugh et al.
(Continued)

FOREIGN PATENT DOCUMENTS

DE 19804132 C1 * 9/1999 ............. F01C 21/02
DE 202006012409 U1 10/2006
EP 0558888 A1 9/1993

OTHER PUBLICATIONS

DE19804132 C1—Hass et al.—Sealing System for a Gear Pump for High-Viscosity Rubber, Polymer Materials and Similar Products to Be Pumped—Sep. 9, 1999_13 English Translation -.*
(Continued)

*Primary Examiner* — Theresa Trieu

(57) ABSTRACT

A pump includes a front plate, a gear plate and a rear plate. A drive shaft has a drive gear, an arbor has a driven gear engaged with the drive gear, and first and second bearings are disposed in the gear plate. The first and second bearings receive the drive shaft and the arbor. The rear plate has drain ports adjacent ends of the drive shaft and the arbor. The arbor has an opening such that media that passes between the first bearing and an outer surface of the arbor is directed to the second drain port via the opening. A drain bushing is positioned against the front plate, and includes an opening for the drive shaft. The drain bushing has a chamber and a radial port. When pumped media passes between the first bearing and the drive shaft it is directed to the chamber and out the radial port.

18 Claims, 8 Drawing Sheets

(51) Int. Cl.
*F04C 2/00* (2006.01)
*F04C 15/00* (2006.01)
*F04C 2/14* (2006.01)
*F04C 2/18* (2006.01)
*F04C 13/00* (2006.01)
*F16C 33/04* (2006.01)

(52) U.S. Cl.
CPC ........ *F04C 13/005* (2013.01); *F04C 15/0046* (2013.01); *F04C 15/0057* (2013.01); *F16C 33/04* (2013.01); *F04C 2240/50* (2013.01); *F04C 2240/60* (2013.01); *F16C 2360/00* (2013.01)

(58) Field of Classification Search
USPC ........... 418/104, 131–133, 191, 206.1–206.9
See application file for complete search history.

(56) References Cited

U.S. PATENT DOCUMENTS

| | | |
|---|---|---|
| 3,063,378 A | 11/1962 | Hart et al. |
| 3,817,665 A | 6/1974 | Myers |
| 2013/0259729 A1 | 10/2013 | Alexander et al. |

OTHER PUBLICATIONS

International Search Report and Written Opinion dated Jul. 21, 2015 for PCT Application, PCT/US2015/025904 filed Apr. 15, 2015.
Supplementary European Search Report dated Jan. 29, 2018 for corresponding EPO 15796150.9.

\* cited by examiner

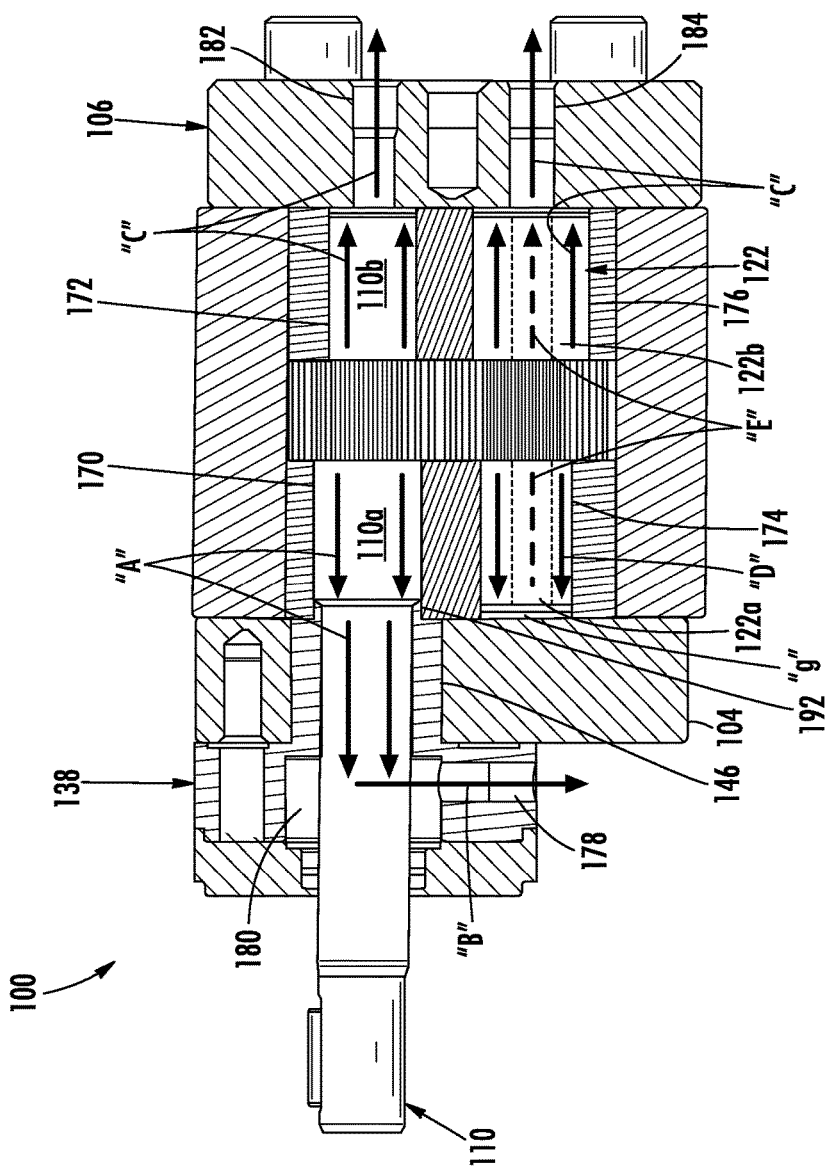

GEAR PUMP HAVING THROUGH-SHAFT BEARING WEEPAGE CONTROL

FIELD OF THE DISCLOSURE

The disclosure generally relates to internal drainage arrangements for pump assemblies, and more particularly to an internal media drainage arrangement for use in gear pumps.

BACKGROUND OF THE DISCLOSURE

Gear pumps often include a housing or plate that holds a set of intermeshing gears. As the gears turn, fluid moves between the gear teeth and the housing and is expelled out the pump due to the intermeshing of the gears. The gears are attached to shafts that run axially from the gear faces, and these shafts run on one or more bearing surfaces.

Gear pumps are employed in a variety of industrial applications, including the pumping of liquid (molten) polymer. As will be understood, in polymer pumping applications, shear degradation of the polymer can occur in the journal bearings associated with the drive gear and the driven gear(s). As a result, reintegration of the degraded material into the flow stream is undesirable, and thus, the material must be removed from the pump after it passes through the bearings. Current approaches result in incomplete removal and/or result in material leakage to the environment, which is undesirable.

In some cases the degraded material is removed by venting high pressure zones at the outboard ends of the pump bearings—through the pump end plates—to a lower pressure region. This results in the degraded material being drawn through the end plates to the lower pressure region where it can be collected. In other cases positive pumping spiral grooves have been provided on a drive shaft extension. As the drive shaft rotates the grooves pump the degraded material away from the bearings and out to the environment. Weepage of media past the shaft bearing has been controlled using a packing seal to throttle the flow rate through the bearing.

Handling and processing of the material once it has been evacuated from the pump is difficult. If simply released to the environment, the degraded polymer will continue to build up on or near the pump until it is mechanically removed. If released to a closed system, a packing seal is still often used around the drive shaft and this packing seal requires periodic mechanical removal of the polymer which builds up over time.

Thus, there is a need for a drainage arrangement that enables continuous removal and collection of degraded polymer, and which eliminates the need for periodic cleaning of degraded polymer from pump surfaces and surrounding surfaces.

SUMMARY OF THE DISCLOSURE

A drive shaft having a drive gear, an arbor having a driven gear engaged with the drive gear, and first and second bearings are disposed in the gear plate. The first and second bearings each have a first opening for receiving the drive shaft and a second opening for receiving the arbor. The rear plate has first and second drain ports disposed adjacent to respective ends of the drive shaft and the arbor. The arbor has a longitudinal opening such that pumped media that passes between the first bearing and an outer surface of the arbor is directed to the second drain port via the longitudinal opening.

BRIEF DESCRIPTION OF THE DRAWINGS

By way of example, a specific embodiment of the disclosed device will now be described, with reference to the accompanying drawings, in which:

FIG. 6 is a cross-section of the pump of FIG. 1 showing exemplary fluid drainage paths through the pump.

DETAILED DESCRIPTION

A drainage arrangement is disclosed for use in draining degraded media from a pump. The typical spiral pumping seal or packing rings used to seal the shaft diameter where it passes through the front plate has been replaced with a drain bushing and lip seal. This arrangement collects the material that normally passes through the front driveshaft bearing and drains it off by means of a radial hole in the drain bushing. Media that passes through the other three bearings is directed to two adjacent ports on the rear cover plate of the pump. This feature is facilitated by the removal of the primary recirculation paths in the pump and by installing of a hollow driven shaft (arbor) that creates a flow path from the outboard end of the front bearing to the outboard end of the rear bearing adjacent to the port in the rear plate.

Figure 1:
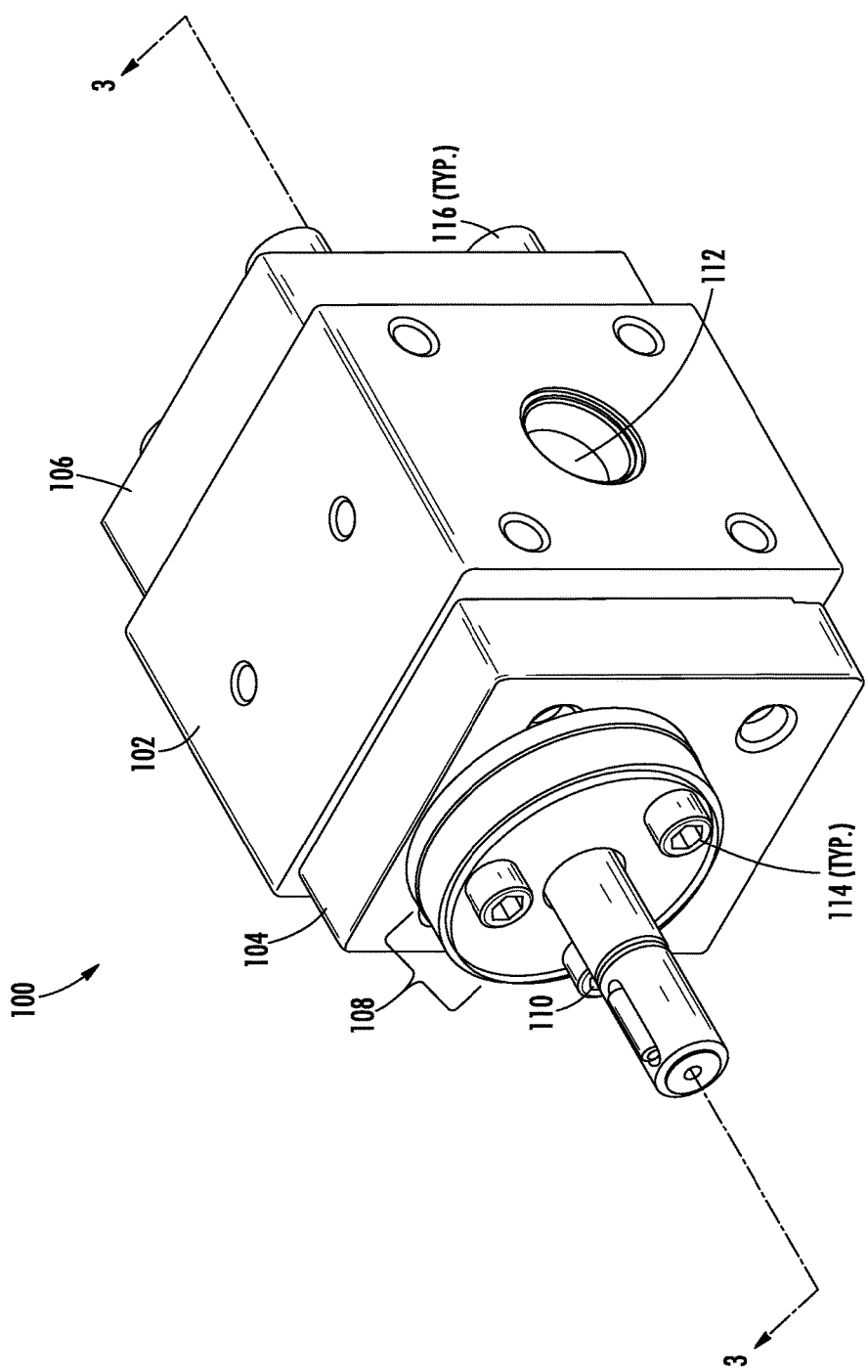
FIG. 1 is an isometric view of a pump according to the disclosure.
Figure 2:
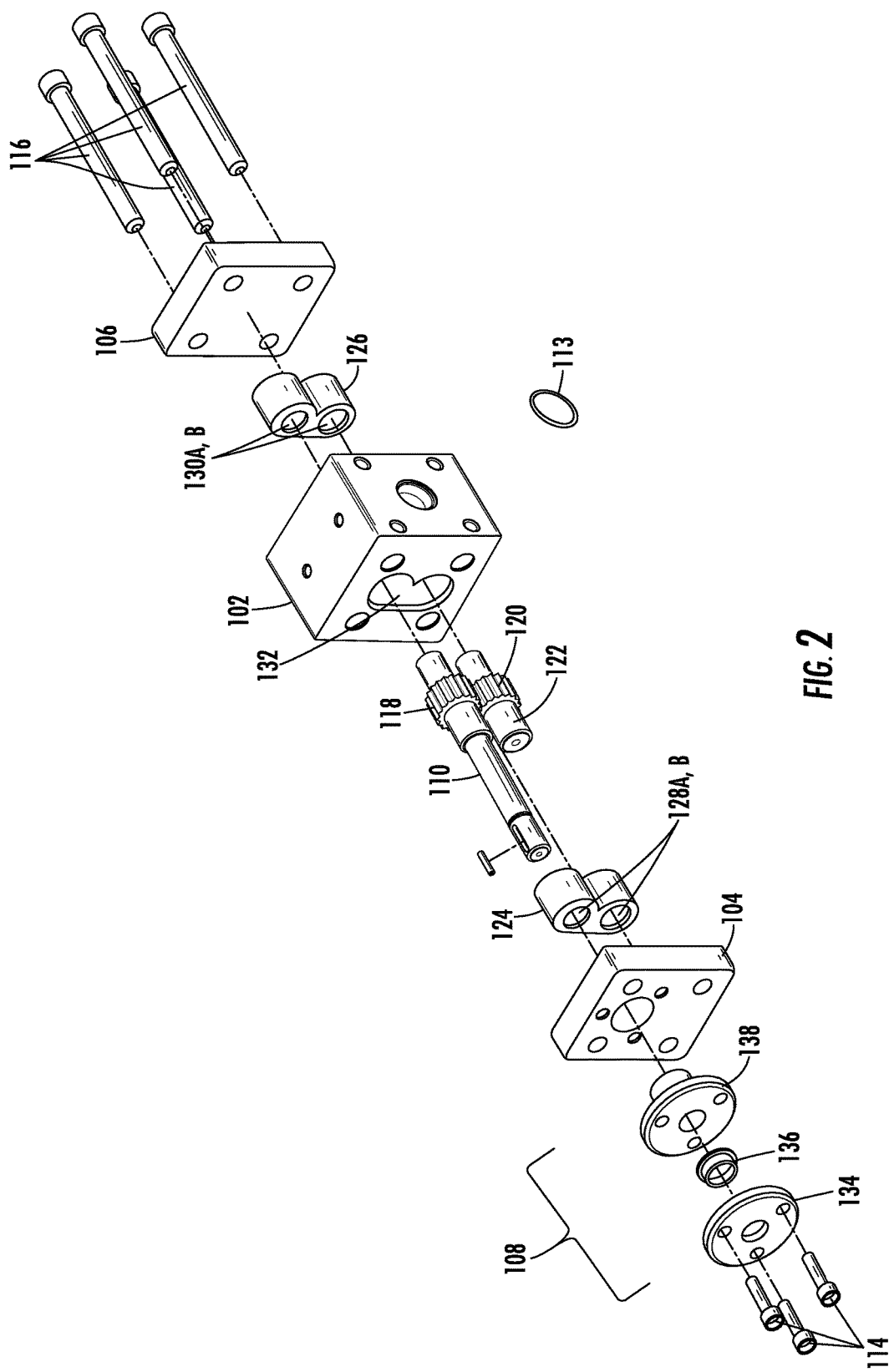
FIG. 2 is an exploded view of the pump of FIG. 1.
Figure 3:
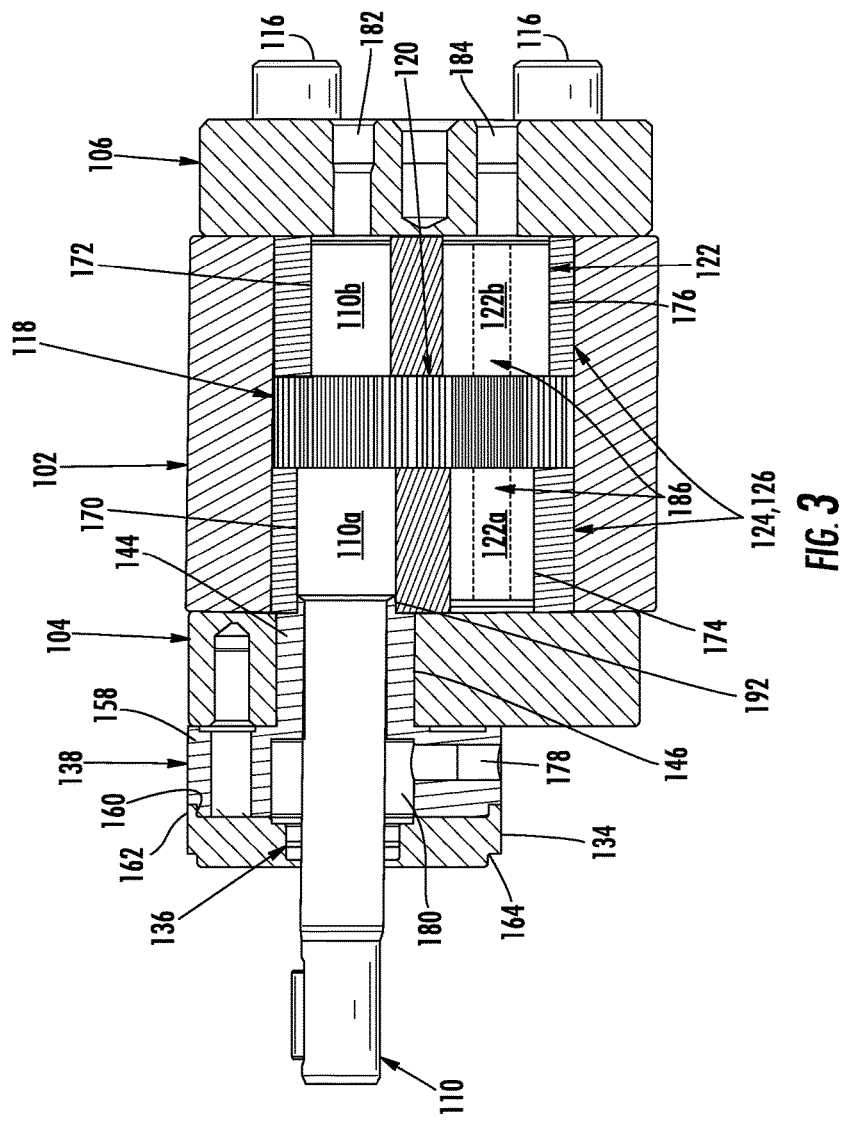
FIG. 3 is a cross-section of the pump of FIG. 1 taken along line 3-3 of FIG. 1.

Referring now to FIGS. 1-3, an exemplary gear pump 100 is shown. The pump 100 may include a central gear plate 102, front and rear plates 104, 106, a shaft seal assembly 108 and a drive shaft 110. An inlet port (not shown) and an outlet port 112 may be formed in the central gear plate for moving fluid through the pump 100. The inlet and outlet ports may be coupled to inlet and outlet piping or tubing using a suitable c-ring 113. The pump 100 may be fixed in its assembled form via a plurality of fasteners 114, 116, which in the illustrated embodiment are socket head cap screws.

FIG. 2 shows the pump 100 in exploded form. As can be seen, a drive shaft 110 includes a drive gear 118 which intermeshes with a driven gear 120 disposed on an arbor 122. First and second bearings 124, 126 are positioned on opposite sides of the first and second gears 118, 120 and receive the drive shaft 110 and arbor 122 via respective bores 128A, B, 130A, B, respectively. These bearings 124, 126 may be substantially the same as those disclosed in pending U.S. patent application Ser. No. 13/850,884, filed Mar. 27, 2014, and titled "Gear Pump with Asymmetrical Dual Bearing," the entirety of which is incorporated by reference herein. The first and second gears 118, 120 and first and second bearings 124, 126 are received within an asymmetrical opening 132 in the central gear plate 102.

Thus arranged, the first and second bearings 124, 126 engage first and second portions 110a, 110b of the drive shaft 110 to form a front top bearing 170 and a rear top bearing 172, respectively. The first and second bearings 124, 126 likewise engage first and second portions 122a, 122b of the arbor 122 to form a front bottom bearing 174 and a rear bottom bearing 176.

The shaft seal assembly 108 may include a plurality of sealing elements configured to control fluid leakage around the drive shaft 110. In the illustrated embodiment, the shaft seal assembly 108 comprises a lip seal housing 134, a lip seal 136 and a drain bushing 138, which may be fixed together in the stacked relation shown in FIG. 3. The lip seal 136 may be held in a recess formed in the lip seal housing 134 and may form a radial seal around the drive shaft 110, and may form a face seal between the drain bushing 138 and the lip seal housing 134.

A cylindrical body portion 144 of the drain bushing 138 may be received in an opening 146 of the front plate 104. The drain bushing 138, lip seal 136 and lip seal housing 134 may all have corresponding central bores which receive a portion of the drive shaft 110 therethrough.

The pump 100 may also include alignment, or "piloting" features on the sealing elements, thus improving concentricity between the axes of the sealing elements and the axis of the shaft, which are otherwise independent features. As shown, the drain bushing 138 includes a flange portion 158 having a forward facing circumferential alignment recess 160 disposed adjacent to the perimeter of the flange portion. As will be appreciated this alignment recess 160 can be used to align one or more secondary seals. In the illustrated embodiment, the alignment recess 160 receives a rearward protruding circumferential lip portion 162 of the lip seal housing 134. By fitting the circumferential lip portion 162 into the alignment recess 160, a desired high degree of concentricity between the axis of the drive shaft 110 and the lip seal axis can be achieved. As shown, the lip seal housing 134 includes its own alignment recess 164 disposed on a forward facing portion of the housing. This alignment recess 164 can be used to align additional sealing elements (not shown), as desired.

During assembly, the drain bushing 138 may be bolted to the front plate 104. There may be a loose clearance fit between the outer surface of the cylindrical body portion 144 of the drain bushing and the front plate 104. Since the drain bushing is not tightly located on the front plate 104, this loose fit reduces the chances of pump binding during assembly, when the fasteners 114 are tightened.

The pump 100 includes a plurality of drain ports for removing degraded media. In the illustrated embodiment, a front drain port 178 is disposed in the drain bushing 138. The front drain port 178 is disposed radially in the flange portion 158 of the drain bushing, and is in fluid communication with a central chamber 180 for draining media that passes through the top front bearing 170. First and second rear ports 182, 184 are disposed in the rear plate 106 directly adjacent to the top rear bearing 172 and the bottom rear bearing 176, respectively, for draining media that passes through the top rear bearing and the bottom rear bearing. The second rear port 184 also receives media that passes through the bottom front bearing 174, as will be described in greater detail later.

The arbor 122 includes a longitudinal opening 186 that runs the full length of the arbor. As will be described in greater detail later, this longitudinal opening 186 serves as a conduit enabling media passing through the bottom front bearing 174 to be directed out the second rear port 184, thus eliminating the need for a separate front port.

Figure 4A:
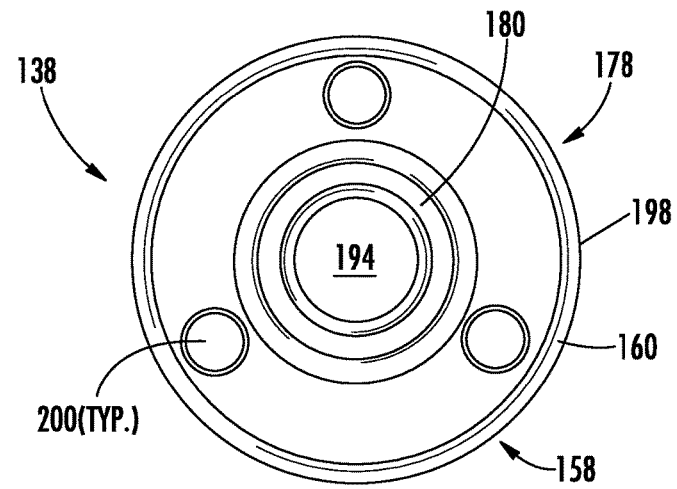
FIGS. 4A-4C are front, cross-section and rear views, respectively of an exemplary drain bushing according to an embodiment of the disclosure.
Figure 4B:
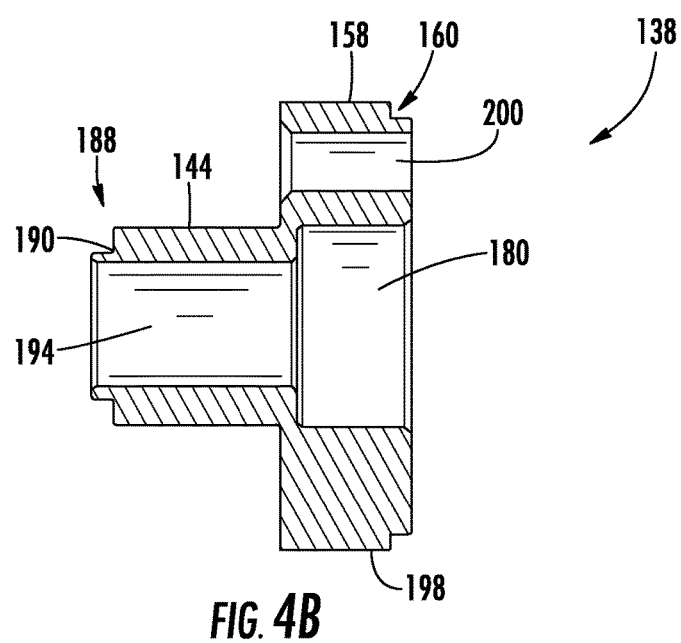
Figure 4C:
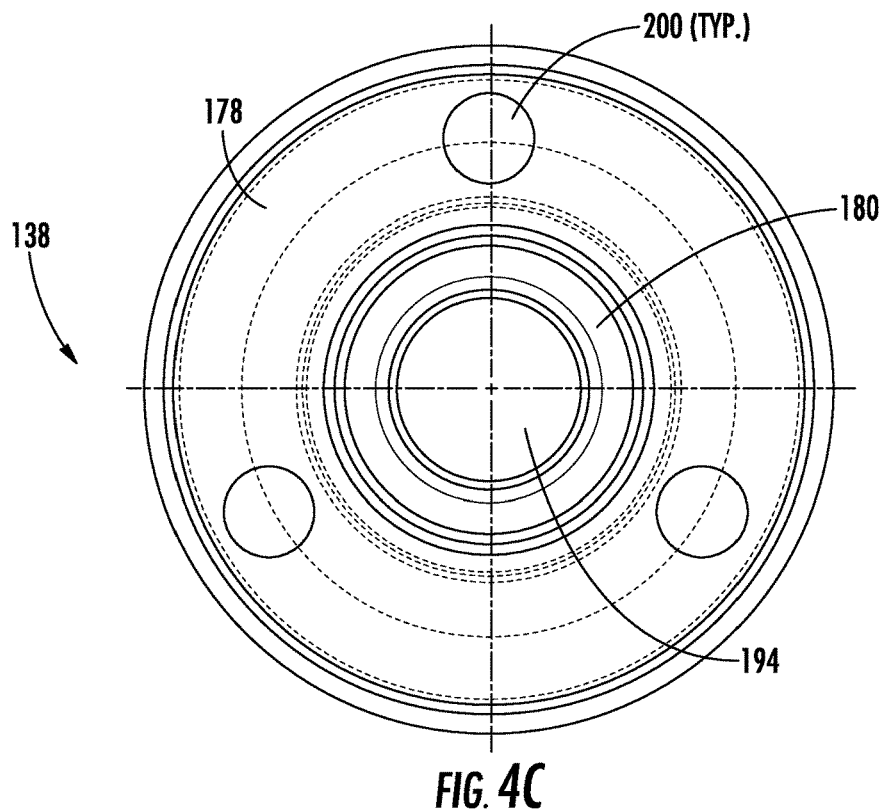
Figure 5A:
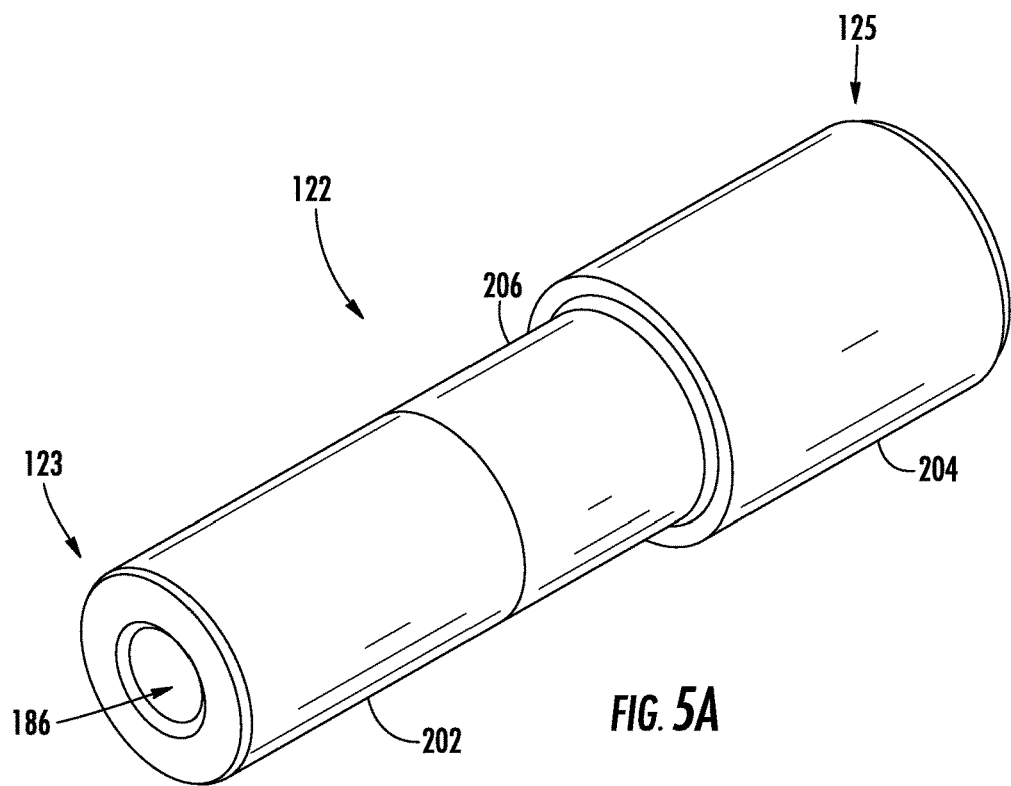
FIGS. 5A-5D are isometric, side, cross-section and end views, respectively, of an exemplary arbor according to an embodiment of the disclosure.
Figure 5B:
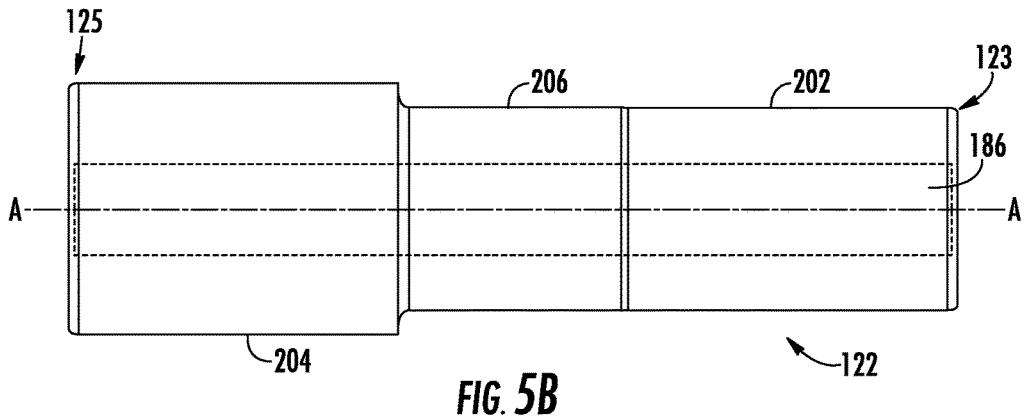
Figure 5C:
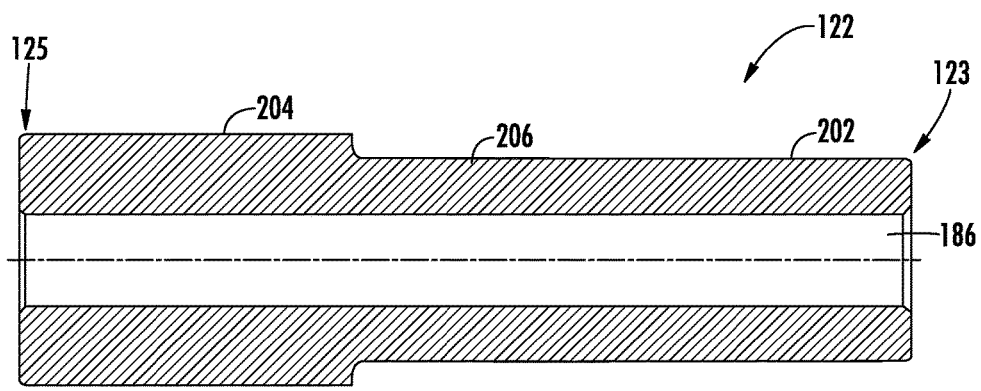
Figure 5D:
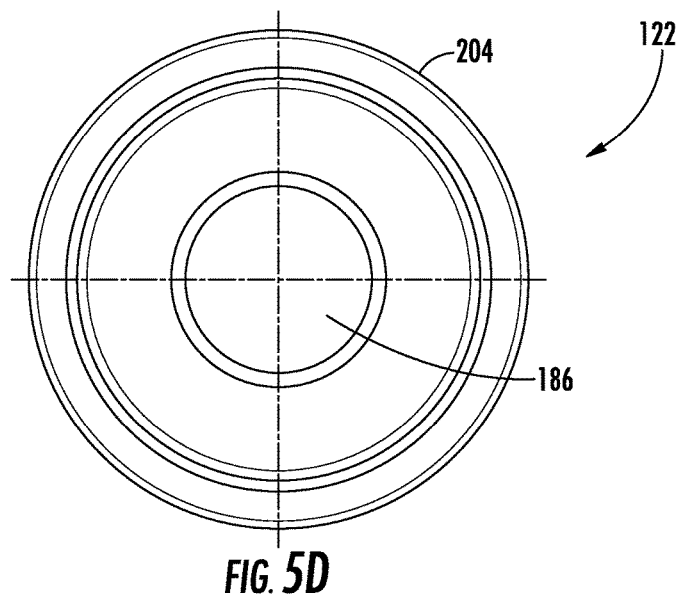

FIGS. 4A-4C show the drain bushing 138 in greater detail. The drain bushing 138 includes a flange portion 158 and a cylindrical body portion 144. The cylindrical body portion 144 is sized to be received within an opening 146 in the front plate 104 (see FIG. 3). A rear end 188 of the cylindrical body portion 144 has a shoulder 190 sized to engage with an inside diameter 192 (FIG. 3) of the first bearing 124 to precisely align the drain bushing 138 with respect to the drive shaft 110 and the first bearing 124.

The flange portion 158 includes a central chamber 180 in fluid communication with the central bore 194 of the cylindrical body portion 144. Thus, media that passes through the front top bearing 110a then passes between the drive shaft 110 and the central bore 194 of the cylindrical body portion 144 where it can collect in the central chamber 180. A radially-oriented port 178 is disposed in the flange portion 158. The radially-oriented port 178 runs between the chamber 180 and an outer surface 198 of the flange portion 158, providing a fluid path between the chamber and the outer surface 198 of the flange portion. In one non-limiting exemplary embodiment, the radially-oriented port 178 may comprise a tapped hole suitable for connecting to a tube or pipe fitting of an appropriate external fluid handling system (not shown).

The flange portion 158 can have a plurality of openings 200 sized and configured to receive the fasteners 114 (see FIG. 1) therethrough.

FIGS. 5A-5D show the arbor 122 in greater detail. As shown, the arbor 122 has first and second ends 123, 125 and a longitudinal axis A-A. The arbor 122 includes first and second end portions 202, 204 and a central portion 206. The first and second end portions 202, 204 are sized to be received within respective bores 128A, B; 130A, B (FIG. 1) of the first and second bearings 124, 126. In the illustrated embodiment the first end portion 202 has a smaller diameter than the second end portion 204, but this is not critical and other relative sizings could also be used. The central portion 206 can be sized to receive the driven gear 120 thereon.

A longitudinal opening 186 runs between the first and second ends 123, 125 along the longitudinal axis A-A of the arbor 122. The arbor 122 may have a beveled counterbore adjacent the longitudinal opening 186 at the first and second ends 123, 125.

FIG. 6 shows an exemplary media drainage paths through the pump 100 during operation. As can be seen, media passing through the front top bearing 170 (in the direction of arrow "A") passes to the central chamber 180 and is then evacuated through the radially oriented port 178 in the drain bushing 128 (in the direction of arrow "B"). The media is contained by the lip seal 136 positioned outboard of the drain bushing 138, and thus media does not pass between the drive shaft 110 and the lip seal housing 134. The drain bushing 138 is piloted on (aligned with) the first bearing 124 to maintain desired clearance and concentricity with the drive shaft 110. The lip seal 136 is piloted on the drain bushing 138 to also maintain concentricity with the driveshaft 110.

Media passing through the rear top bearing 172 and rear bottom bearing 176 (in the direction of arrow "C") is evacuated through the first and second rear ports 182, 184 in the rear cover plate 106. Media passing through the front bottom bearing 174 first flows toward the front plate 104 (in the direction of arrow "D"). When the media reaches the front plate 104, it passes into the longitudinal opening 186 at the first end 123 of the arbor 122 via a gap "g" between the first end 123 of the arbor and the opposing surface of the front plate 104. The media then flows in the opposite direction (in the direction of arrow "E") toward the rear plate 106 where it is evacuated via the second rear port 184 along with the media passing through the rear bottom bearing 176.

The first and second rear ports 182, 184 may comprise tapped holes for connecting to a tube or pipe fitting of an appropriate external fluid handling system (not shown).

All major internal recirculation paths have been eliminated versus the traditional polymer pump design which incorporates recirculation of polymer to the pump inlet or discharge after it has traversed the bearings. A hollow dowel is used in lieu of an additional evacuation connection located on the front plate in other weeping pump designs. Instead of the typical packing seal being used to throttle bearing leakage at the driveshaft seal in an uncontrolled manner to the environment, a drain bushing and lip seal is used to completely contain the degraded polymer once it passes through the bearing.

This solution results in all of the evacuated material being isolated from the environment by connections to an onsite evacuation system.

This reduces maintenance cost and eliminates the need to mechanically remove material from the outer surfaces of the pump. This solution also eliminates typical recurring maintenance associated with the packing seal arrangement. Utilization of a lip seal in lieu of a packing seal increases the service life of the driveshaft.

Figure 7:
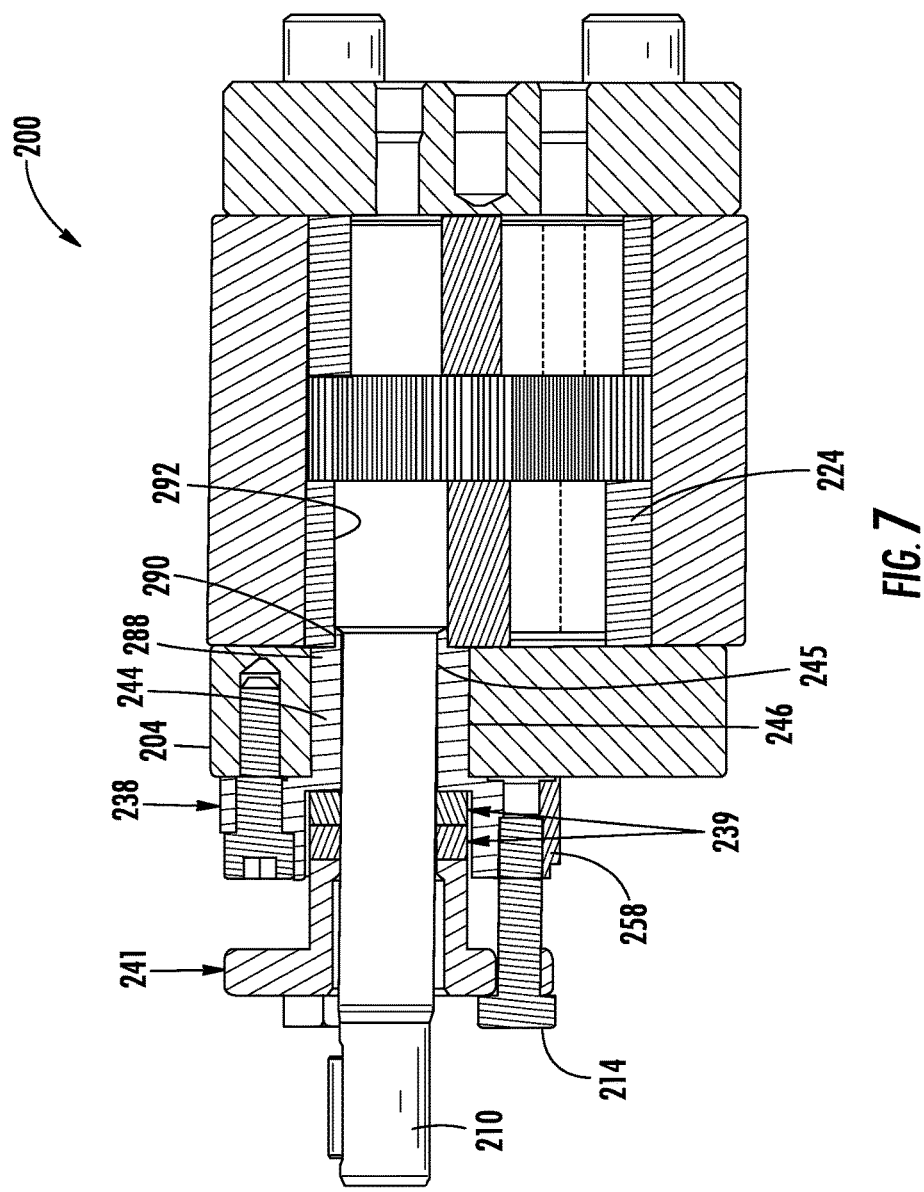
FIG. 7 is a cross-section of an alternative embodiment of the disclosed drain arrangement.

FIG. 7 shows an exemplary alternative embodiment of a drainage arrangement for a pump 200 in which a packing seal is used to control weepage of media past the driveshaft 210. The pump 200 of this embodiment may have all of the features disclosed in relation to the pump 100 described in relation to FIGS. 1-6, with the exception that pump 200 does not include drain bushing with a drain port, nor does pump 200 include a lip seal or a lip seal housing. Instead, to enable controlled weepage of media past the drive shaft 210, the pump 200 includes a packing housing 238, packing rings 239 and a packing gland 241.

The packing housing 238 includes a flange portion 258 and a cylindrical body portion 244. The cylindrical body portion 244 fits within an opening 246 in the front plate 204. A bore 245 in the cylindrical body portion 244 receives the drive shaft 210 therethrough. A rear end 288 of the cylindrical body portion 244 has a shoulder 290 sized to engage with an inside diameter 292 of the first bearing 224 to precisely align the packing housing 238 with respect to the drive shaft 210 and the first bearing 224.

By aligning the packing housing 238 in this manner, more reproducible leakage control can be obtained due to the improved concentricity of the packing rings 239 about the drive shaft 210. Adjustment of the packing seal is accomplished by adjusting the packing fasteners 214.

The disclosed arrangements may find use in non-polymer applications where recirculating of the media is undesirable. This solution can also be utilized in any application where purity of the pumped product is of the utmost concern to ensure mechanical wear in the bearing areas does not introduce trace amounts of metal into the pump flow stream.

Based on the foregoing information, it will be readily understood by those persons skilled in the art that the invention is susceptible of broad utility and application. Many embodiments and adaptations of the invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the invention has been described herein in detail in relation to its preferred embodiment, it is to be understood that this disclosure is only illustrative and exemplary of the present invention and is made merely for the purpose of providing a full and enabling disclosure of the invention. The foregoing disclosure is not intended to be construed to limit the invention or otherwise exclude any such other embodiments, adaptations, variations, modifications or equivalent arrangements; the invention being limited only by the claims appended hereto and the equivalents thereof. Although specific terms are employed herein, they are used in a generic and descriptive sense only and not for the purpose of limitation.

What is claimed is:

1. A gear pump, comprising:
    a front plate, a gear plate and a rear plate;
    a drive shaft having a drive gear;
    an arbor having a driven gear engaged with the drive gear;
    first and second bearings disposed in the gear plate, the first and second bearings each having a first opening for receiving the drive shaft and a second opening for receiving the arbor;
    wherein the rear plate has first and second drain ports disposed adjacent to respective ends of the drive shaft and the arbor; and
    wherein the arbor has a longitudinal opening therethrough, such that pumped media is passable between the first bearing and an outer surface of the arbor in a first direction, and flowable to the second drain port via the longitudinal opening in a second direction different from the first direction.

2. The gear pump of claim 1, wherein the pumped is passable in the first direction toward the front plate.

3. The gear pump of claim 2, further comprising a gap between an end of the arbor and the front plate such that the pumped media passable between the first bearing and the outer surface of the arbor in the first direction is flowable into the longitudinal opening in the arbor in the second direction.

4. The gear pump of claim 3, wherein the longitudinal opening is aligned with the second drain port so that the pumped media within the longitudinal opening in the arbor is directed to the second drain port.

5. The gear pump of claim 1, wherein pumped media passable between the second bearing and an outer surface of the arbor is flowable to the second drain port.

6. The gear pump of claim 5, wherein the pumped media passable between the first bearing and the outer surface of the arbor is combinable with the pumped media that passable between the second bearing and an outer surface of the arbor at the second drain port.

7. The gear pump of claim 1, wherein pumped media passable between the second bearing and an outer surface of the drive shaft is flowable to the first drain port.

8. The gear pump of claim 1, further comprising:
    a drain bushing having an opening for receiving the drive shaft, the drain bushing having a central chamber surrounding the drive shaft and a third drain port, the central chamber in fluid communication with the third drain port;
    wherein pumped media passable between the first bearing and the drive shaft is flowable to the central chamber and out the third drain port.

9. The gear pump of claim 8, wherein the drain bushing includes a flange portion and a cylindrical body portion, the cylindrical body portion sized to be received within an opening in the front plate.

10. The gear pump of claim 9, wherein a rear end of the cylindrical body portion has a shoulder sized to engage with an inside diameter of the first bearing to align the drain bushing with respect to the drive shaft and the first bearing.

11. The gear pump of claim 10, wherein the flange portion includes the central chamber, the central chamber is in fluid communication with a central bore of the cylindrical body portion such that pumped media is passable through a front top bearing between the drive shaft and the central bore of the cylindrical body portion for collection in the central chamber.

12. The gear pump of claim 8, wherein the third drain port is a radially oriented drain port that runs between the central chamber and an outer surface of the flange portion to provide a fluid path between the central chamber and the outer surface of the flange portion.

13. The gear pump of claim 8, further comprising a lip seal housing engaged with the drain bushing, the lip seal housing having a lip seal disposed about the drive shaft to prevent pumped media from passing by through the lip seal housing.

14. The pump of claim 8, wherein the drain bushing has a shoulder received within a portion of the first bearing to align the drain bushing with respect to the drive shaft.

15. The pump of claim 1, further comprising:
a packing housing having an opening for receiving the drive shaft,
a plurality of packing rings disposed within the packing housing, the plurality of packing rings engaging the drive shaft; and
a packing gland for engaging the plurality of packing rings;
wherein adjusting the position of the packing gland adjusts a leakage rate of media past the packing rings.

16. The pump of claim 15, wherein the packing housing has a shoulder received within a portion of the first bearing to align the packing housing with respect to the drive shaft.

17. The gear pump of claim 1, wherein the arbor has a beveled counterbore adjacent the longitudinal opening at first and second ends of the arbor.

18. The gear pump of claim 1, wherein the first and second drain ports in the rear plate are disposed directly adjacent to a top rear bearing and a bottom rear bearing of the second bearing.

* * * * *